United States Patent Office 3,119,787
Patented Jan. 28, 1964

3,119,787
BLOCK COPOLYMERS OF POLYCARBONATES FROM BISPHENOL A AND TETRACHLOROBISPHENOL A
Thomas M. Laakso and David A. Buckley, Rochester, N.Y., assignors to Eastman Kodak Company, Rochester, N.Y., a corporation of New Jersey
No Drawing. Filed May 25, 1959, Ser. No. 815,273
4 Claims. (Cl. 260—47)

This invention relates to an improved polycarbonate of tetrachlorobisphenol A which is essentially composed of alternating blocks having structures composed of (I) recurring units from tetrachlorobisphenol A and (II) recurring units from bisphenol A wherein from about 15 of 35 mole percent of the recurring units are derived from bisphenol A. This invention also relates to a process for preparing these block polymers. These block polymers are characterized by having high heat softening temperatures, a high Young's Modulus of elasticity and a high degree of flexibility. Useful photographic elements are also included in this invention wherein a film of the improved polycarbonate supports a coating of light-sensitive emulsion.

The preparation of polycarbonates of the general class with which this invention is concerned is well known in the art. A number of patents have been issued in the last few years describing polycarbonates prepared from bisphenol A and from tetrachlorobisphenol A. Among the prior art are various articles in the literature concerning this subject including an article by Schnell as to polycarbonates as a new group of plastics and the preparation and properties of aromatic polyesters of carbonic acid, Angewandte Chemie, 68: 633–660, No. 20, October 21, 1956.

An object of this invention is to provide an especially valuable improved polycarbonate predominantly derived from tetrachlorobisphenol A which has quite unusual properties which are unexpected in view of the prior art.

A further object of this invention is to provide a process for preparing such improved polycarbonates which are characterized by a block structure.

A further object of this invention is to provide photographic elements comprising a film support prepared from the improved polycarbonates provided by this invention and coated with a light-sensitive silver halide photographic emulsion.

Other objects will become apparent elsewhere herein.

According to a preferred embodiment of this invention there is provided an improved polycarbonate of tetrachlorobisphenol A consisting of a highly polymeric block copolymer having an inherent viscosity of from about 0.5 to about 3.5 essentially composed of alternating blocks having the structures:

I. Blocks composed of from about 3 to about 50 recurring units having the following formula (A):

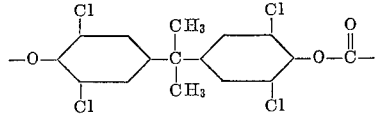

and

II. Blocks composed of about 3 to about 50 recurring units having the following formula (B):

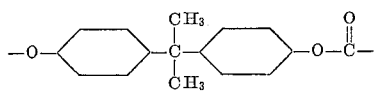

wherein from about 15 to 35 mole percent of said block copolymer is composed of said units having formula (B), said block polymer being characterized by having a heat softening temperature in the range of from about 180°–240° C., having a Young's Modulus of elasticity for film which is substantially as great as for the homopolymer of units of formula (A) and at least about 30,000 kg./sq. cm., and having a flexibility measured by the M.I.T. folds test at least about 3 times greater than for the homopolymer of units of formula (A) and at least about 50.

Thus, this invention provides a highly useful series of high molecular weight block unit polymers having two different prepolymer blocks of units of a linear polycarbonate of 2,2-bis(4-hydroxyphenyl)propane and a linear polycarbonate of 2,2-bis(3,5-dichloro-4-hydroxyphenyl)propane. This series of block copolymers possesses to a surprisingly satisfactory degree the valuable properties of all of the blocks present in the polymer. This is considered an unobvious discovery for various reasons including the fact that neither the random copolymers nor mixtures of the individual high molecular weight homopolymers yield the results achieved in accordance with this invention. Moreover, the series of block copolymers encompassed by this invention have a most unexpectedly high degree of flexibility as measured by the M.I.T. folds test and which is an important characteristic of any film to be used as a support for a photographic element.

The article mentioned above written by Schnell explains that the broad concept of such polycarbonates as are contemplated by this invention was known prior to the discoveries disclosed herein. Work in various places based upon the activities of workers in this art during the past half century has recently resulted in a preparation of commercial polycarbonate films derived from bisphenol A which is more specifically known as 2,2-bis(4-hydroxyphenyl)propane. It appears that such bisphenol A polycarbonates are not only being commercially used for many of the purposes for which films in general are useful but that they are also being contemplated for certain rather severely limited utility as a photographic film support. Thus, the use of polycarbonates from bisphenol A as a photographic base is very seriously limited by the fact that the Young's Modulus of elasticity is only somewhere on the order of about 23,000 kg./sq. cm. This compares quite unfavorably with other commercially available film bases such as cellulose triacetate where the Young's Modulus lies in the range of 30,000–40,000. Another film base useful for photographic purposes is oriented polystyrene which has a Young's Modulus somewhere on the order of about 32,000 kg./sq. cm.

It is obvious that for a photographic film base to be a significant improvement over the prior art it should have some properties which render it substantially superior to cellulose triacetate which is generally recognized as the most commonly used satisfactory film base for photographic purposes. The tremendous number of characteristics and properties of photographic film bases is well known in the art relating to photography. The work in recent years in this art has tended toward the development of new base materials such as the general class of polyesters including polycarbonates, polyvinyl derivatives such as polystyrene, etc. A polyester such as polyethylene terephthalate is useful as a film base but cannot be solvent cast by the practicable techniques so carefully and thoroughly developed during the last few decades with regard to cellulose esters as film bases. Although polyvinyl derivatives such as polystyrene can be solvent cast, a film base prepared from polystyrene (even though it has been oriented) has a heat softening temperature on the order of only about 100° C. and therefore has rather limited utility. In contrast, a film base derived from cellulose triacetate has a heat softening temperature on the order of about 155° C.

The photographic film bases which can be solvent cast and which have been described in the prior art as of commercial value such as cellulose triacetate and polystyrene are considered to have flexibilities which are merely on the edge of being satisfactorily acceptable. Thus, cellulose triacetate has a flexibility as measured by the M.I.T. folds test of about 25–35 folds. Polystyrene is somewhat better and has an average flexibility of about 50.

With the development of polycarbonate films such as can be derived from bisphenol A it became obvious that they had promise with regard to their use as photographic film bases provided that the Young's Modulus of elasticity could be improved upon. One polycarbonate mentioned by Schnell and by others which appeared to have some promise was that derived from tetrachlorobisphenol A since this polycarbonate as a film has a Young's Modulus of elasticity of about 30,000 kg./sq. cm. This value is substantially the same as the lowest values ordinarily measured for cellulose triacetate film bases. However, the flexibility of well cured films of a homopolymer of tetrachlorobisphenol A was found to be extremely low and quite unsatisfactory for commercial applications as a photographic film base.

One possibility which was considered by the inventors was the preparation of random copolymers of tetrachlorobisphenol A and bisphenol A with a view toward obtaining a copolymer which might have improved flexibility and a reasonably high heat softening temperature along with all of the other properties necessary for satisfactory utility as a photographic film support. However, it was found that such modifications of the polycarbonate from tetrachlorobisphenol A resulted in further reductions in the flexibility of films prepared therefrom. Moreover, the heat softening temperature was significantly reduced. Further work was also performed involving mixtures of homopolymers from bisphenol A. In doing this it was found that the Young's Modulus was significantly reduced although in some cases it still retained satisfactory value for marginal utility of limited use for certain photographic film purposes.

It was, therefore, quite surprising when it was found that block copolymers prepared in accordance with the invention described herein had a Young's Modulus substantially as great as for the homopolymer derived from tetrachlorobisphenol A and at least about 30,000 kg./sq. cm. It was even more surprising to find that these block copolymers had flexibility values measured by the M.I.T. folds test of at least about 3 times greater than for the homopolymer of tetrachlorobisphenol A and at least about 50, which is substantially as good as polystyrene and significantly better than cellulose triacetate film bases. Other tests disclosed that the polycarbonates contemplated by this invention had other properties and characteristics which rendered them quite useful as photographic film supports. Such other properties have been adequately described in the prior art with regard to polycarbonates of this general type.

Perhaps the most outstanding property of the polycarbonate film bases is the retention of the Young's Modulus of elasticity at much higher temperatures than in the case of film from cellulose triacetate, polystyrene in oriented form and polyethylene terephthalate in oriented form. Thus, the polycarbonate films produced in accordance with the present invention retain to a substantial degree their high modulus of elasticity at temperatures up to and somewhat beyond their heat softening temperatures, namely 180°–240° C. In contrast, the retention of Young's Modulus for polyethylene terephthalate begins to fall off very rapidly at temperatures of about 100° C. and becomes significantly less than the Young's Modulus for the polycarbonates of this invention at temperatures approaching 200° C. This factor also applies to film supports prepared from cellulose esters and polystyrene although the drop-off is not as pronounced as it is for polyethylene terephthalate. As a result, the polyesters of this invention have unusually valuable properties as photographic film supports at temperatures above 150° C.

Thus, according to this invention it has been found that by preparing block copolymers consisting of alternating sequences of polycarbonates derived from bisphenol A and tetrachlorobisphenol A (particularly 75 mole percent tetrachlorobisphenol A and 25 mole percent bisphenol A), there is obtained a significant improvement in the substandard properties without sacrificing to any unacceptable degree the desirable values shown by the homopolymers. These block copolymers show physical properties quite different from the random copolymers prepared by conventional methods. That these block copolymers are not physical mixtures is shown by their different solubility characteristic in dimethylformamide at 25° C. The block copolymers are readily soluble in this solvent whereas in a physical mixture of the two homopolymers only the most soluble tetrachlorobisphenol A polymer is dissolved under similar conditions.

This invention can be further illustrated by the following examples of preferred embodiments although it will be understood that these examples are included merely for purposes of illustration and are not intended to limit the scope of the invention unless otherwise specifically indicated:

EXAMPLE I

Preparation of block copolycarbonate of 75 mole percent tetrachlorobisphenol A—25 mole percent bisphenol A:

Simultaneous preparation of the two homopolymer blocks was employed. In a 3-liter, three-necked flask equipped with a stirrer, a thermometer and a dropping-funnel were placed 800 ml. of distilled water, 42 g. (1.05 moles) sodium hydroxide and 137.25 g. (0.375 mole) tetrachlorobisphenol A. When a clear solution was obtained, the flask was cooled to 5° C. by means of an ice bath, and 500 ml. of distilled methylene chloride was added, followed by 2 ml. of tri-n-butylamine. With efficient stirring 40.8 g. (0.412 mole) phosgene dissolved in 100 ml. cold, dry, distilled methylene chloride was added slowly within a period of 25 minutes, keeping the temperature below 8° C.

The above material was combined at once with a similar run prepared simultaneously from bisphenol A as follows:

In a 3-liter, three-necked flask equipped with a stirrer, thermometer and dropping-funnel were placed 300 ml. of distilled water, 15 g. (0.35 mole) sodium hydroxide and 28.5 g. (0.125 mole) bisphenol A. When a clear solution was obtained, the flask was cooled to 16° C. and 150 ml. of distilled methylene chloride was added. With good stirring 18.6 g. (0.188 mole) phosgene dissolved in 100 ml. cold, dry, distilled methylene chloride was added within a period of 5 minutes, keeping the temperature at 18° C.

The I.V. of the two materials being combined (prepolymers) is advantageously in the range of 0.1 to 0.2, however, it can vary from 0.05 to 0.25 or more as in the case of various runs of this and other examples set forth herein.

At the beginning the combined polymerization reactions had a flow time of 2.3 seconds as measured from a standard pipette. After 50 minutes of continuous stirring, the flow time of the combined reaction mixture had increased to 180 seconds. The polymerization was stopped at this time by acidifying the reaction with glacial acetic acid. The methylene chloride layer was diluted with enough methylene chloride to allow more efficient stirring and water washing of the polymer solution free of soluble materials. The polymer was then precipitated from methylene chloride solution by slowly pouring the viscous dope into methyl alcohol. After leaching in fresh methanol, the polymer was dried at 50° under reduced pressure.

The yield of white fibrous polymer was 94% of the theoretical value. It had an inherent viscosity of 0.93 as measured in 1:1 phenol and chlorobenzene solution. Physical properties of this block copolymer were:

| | |
|---|---|
| Young's modulus | kg./cm.$^2$ __ 3.02×10$^4$ |
| Yield | kg./cm.$^2$ __ 900 |
| Tensile | kg./cm.$^2$ __ 900 |
| Elongation, (percent) | 6.5 |
| Tear strength | 70 |
| Flow point | degrees___ 287 |

Other properties are shown in the table below.

Other block copolymers in the range of 15–35 mole percent of BPA (bisphenol A) were similarly prepared and have properties as already described hereinabove.

The unmodified tetrachlorobisphenol A (TC BPA) polymer can be prepared by a preferred procedure as follows:

A solution of 38 g. (0.95 mole) sodium hydroxide and 5 g. (0.022 mole) benzyltriethylammonium chloride was prepared in 300 ml. of distilled water. With continuous and efficient stirring 122 g. (0.30 mole) of 2,2-bis(3,5-dichloro-4-hydroxyphenyl)-propane was added together with 500 ml. of distilled methylene chloride. The temperature of the reaction mixture was kept at 20° C. while 35 g. (0.35 mole) phosgene in 200 ml. of dry distilled methylene chloride was added in 55 minutes. At the end of this time one ml. of triethylamine was added. The cooling water was removed, and stirring was continued for 45 minutes. During this time the viscosity of the methylene chloride layer had increased noticeably (10 sec. as determined with a standard pipette). A slight excess of glacial acetic acid was added to neutralize all the alkali and the methylene chloride layer was washed free of acid with water. The wet polymer solution was then precipitated out of solution by slowly running it into 3 volumes of methyl alcohol. The polymer was leached in fresh methanol to remove residual methylene chloride.

The yield of pure, white, fibrous polycarbonate was 102.5 g. or 91 percent of the theoretical value. The inherent viscosity as determined in phenol-chlorobenzene (50:50) was 0.52.

*Physical Data on Tetrachloro Bisphenol A Polycarbonate Plate Coatings (Coated From 3–1 Dope in Methylene Chloride) (H549–151)*

| | |
|---|---|
| Young's modulus | 3.00×10$^4$ kg./cm.$^2$. |
| Yield stress | 750 kg./cm.$^2$. |
| Tensile strength | 800 kg./cm.$^2$. |
| Elongation | 5 percent. |
| Res. tear | 95. |
| I.V. of the polymer | 0.52. |
| M.P. | 302° C. |
| Swell and shrink | 0.06 percent (125° F.). |
| Heat distortion temperature | over 205° C. (between 220 and 240° C.). |

For comparative purposes the following describes the preparation of random-type copolycarbonate 70 mole percent tetrachlorobisphenol A and 30 mole percent bisphenol A:

In a 3–1, three-necked flask equipped with a stirrer, a thermometer and a dropping-funnel were placed 76.86 g. (0.21 mole) tetrachlorobisphenol A and 20.52 g. (0.09 mole) bisphenol A, together with 33.6 g. (0.84 mole) sodium hydroxide and 800 ml. distilled water. When a clear solution was obtained, the flask was cooled by means of running water to 18° C. and 400 ml. of distilled methylene chloride was added, followed by 2 ml. tri-n-butylamine and 2 g. benzyltriethyl ammonium chloride. With efficient stirring 33 g. (0.33 m.) phosgene dissolved in 80 ml. of distilled dry, cold methylene chloride was added slowly within a period of 25 minutes, keeping the temperature at 10–13° C. At the beginning of the polymerization reaction the solution had a flow time of 2.3 seconds as measured with a standard pipette. After 45 minutes of continuous stirring the flow time was 45 seconds. The polymerization was stopped by acidifying the reaction with glacial acetic acid. The methylene chloride layer was diluted with enough methylene chloride to allow more efficient stirring and water washing of the polymer solution free of soluble materials. The polymer was then precipitated from methylene chloride solution by slowly pouring the viscous solution into methyl alcohol. After leaching in fresh methanol, the polymer was dried at 50° under reduced pressure.

The yield of white fibrous copolymer was 85% of the theoretical value. It had an inherent viscosity of about 0.7 as measured in 1:1 phenol chlorobenzene solution.

Physical properties of above random-type copolymer:

| | |
|---|---|
| Young's modulus | kg./cm.$^2$ __ 2.85×10$^4$ |
| Yield and tensile | kg./cm.$^2$ __ 825 |
| Elongation | percent__ 5 |

Other properties are given in the table hereinbelow as to this random copolycarbonate and others similarly prepared as shown.

Solubility of block copolymers in dimethylformamide at 25° C. was found by taking one gram of 75 mole percent tetrachlorobisphenol A and 25 mole percent of bisphenol A block copolycarbonate (see Example I, viz. the first example given), which copolymer was dissolved in 5 ml. dimethylformamide at 25° by shaking on a "wrist-action" shaker.

One gram of a physical mixture (75/25) of tetrachlorobisphenol A and bisphenol A polycarbonates (both of viscosity near 1.0) was shaken on a "wrist-action" shaker with 5 ml. dimethylformamide at 25° C. Only 0.7 g. of the mixture went into solution.

A sample of a 75/25 physical mixture of tetrachlorobisphenol A polycarbonate and bisphenol A polycarbonate was dissolved in methylene chloride (minimum amount). The polymer was precipitated completely from the methylene chloride solution by slowly pouring it into methyl alcohol. The precipitated polymer was filtered and dried. A one-gram sample of this precipitated material was shaken with 5 ml. of dimethylformamide at 25° C. on a "wrist-action" shaker over night. Only 0.7 g. of the polymer mixture dissolved in the solvent.

Other homopolymer mixtures, other random copolymers and other block copolymers were prepared following the techniques described above using variations in the prescribed conditions and materials so as to obtain the data set forth in the following table. This data shows the value of various properties of solvent cast polycarbonate and comparative films approximately 0.005 inch thick. The values for the comparative films of cellulose triacetate and polystyrene are included in the table since their relationship to the improvement covered by this invention has been discussed hereinabove.

The preparation of film from those various polycarbonate polymers was generally accomplished using methylene chloride as the solvent in proportions such as 4 parts of solvent to 1 part of polymer or other suitable proportions to obtain a dope. The data was generally prepared by the machine coating technique employing a conventional coating machine having a dope hopper from which the dope is flowed onto a highly polished coating wheel from which it is stripped and cured as it passes through drying chambers. Of course, hand coating techniques can also be employed using apparatus wherein a coating knife with a vertically adjustable blade is used to manually spread the dope on a glass plate; the plate is put in an oven and dried for an extended period of time such as 18 hours at about 70° F. Although methylene chloride was generally employed, other solvents can also be used (e.g. other halogenated hydrocarbons)

for the preparation of a solution or dope of the polymer so that it can be solvent cast or coated as described. Although the films tested in the table were not necessarily exactly 5 mils thick, the data set forth was adjusted accordingly so as to be properly comparable.

teristics and found to behave satisfactorily in all regards and to have exceptionally advantageous properties at temperatures in excess of 150° C., a quite satisfactorily high degree of flexibility, and a Young's Modulus of elasticity adequate for normal photographic purposes, Properties of Solvent Cast Polycarbonate and Comparative Films, Approximately 0.005 inch Thick

| Mole Percent BPA | Mole Percent TCBPA | Young's Modulus ($10^4$ kg./sq. cm.) | | | Flexibility (M.I.T. Folds) | | | Heat Softening Temperature (° C.) | | |
|---|---|---|---|---|---|---|---|---|---|---|
| | | Random | Mixed | Block | Random | Mixed | Block | Random | Mixed | Block |
| 100 | 0 | 2.3 | ---- | --- | 148 | --- | ---- | 157 | --- | ------- |
| 80 | 20 | 2.3 | ---- | --- | 62 | --- | ---- | 154 | --- | ------- |
| 75 | 25 | ------ | 2.6 | 2.5 | ------ | 150 | 85 | ------ | 202 | 165 |
| 70 | 30 | 2.3 | ---- | --- | 47 | --- | ---- | 150 | --- | ------- |
| 50 | 50 | 2.9 | 2.6 | 3.0 | 18 | 117 | 30 | 159 | 206 | 140 |
| 30 | 70 | 2.9 | ---- | --- | 10 | --- | ---- | 172 | --- | ------- |
| 25 | 75 | ------ | 2.75 | 3.0 | ------ | 65 | 70 | ------ | 219 | 220-240 |
| 20 | 80 | 2.9 | ---- | --- | 13 | --- | ---- | 200 | --- | ------- |
| 0 | 100 | 3.0 | ---- | --- | 16 | --- | ---- | 220-240 | --- | ------- |
| Cellulose Triacetate | | 3.0-4.0 | ---- | --- | 25-35 | --- | ---- | 155 | --- | ------- |
| Polystyrene (oriented) | | 3.2 | ---- | --- | 50 | --- | ---- | 100 | --- | ------- |

The film supports for photographic purposes contemplated by this invention can be coated with photographic emulsions so as to form a photographic element having unusually valuable properties. The coating of film bases with photographic emulsions is well known in the art and is described in numerous patents and publications such as in a paper by Trivelli and Smith, The Photographic Journal, vol. 79, pages 330–338, 1939. Emulsions such as those described by Trivelli et al. can be readily coated upon the surface of the film base encompassed by this invention using standard coating techniques.

A photographic element was prepared by coating such an emulsion as described by Trivelli and Smith upon the film base described in Example I.

In a container with temperature control was put a solution with the following composition:

(A)

Potassium bromide _____ gm__ 165
Potassium iodide _____ gm__ 5
Gelatin _____ gm__ 65
Water _____ cc__ 1700

And in another container was put a filtered solution consisting of:

(B)

Silver nitrate _____ gm__ 200
Water _____ cc__ 2000

Solution A was kept at a temperature of 70° C. during precipitation and ripening, while solution B was put in a separating funnel at a temperature of 72° C. The silver nitrate solution ran from the separating funnel through a calibrated nozzle into the container, the contents of which were kept in constant motion during precipitation and ripening, and, later, during finishing, by a mechanical stirrer.

After the precipitation, the emulsions were ripened for 20 minutes at the temperature of precipitation (70° C.). Then, they were cooled as quickly as possible to 45° C., and at this temperature 250 gm. of washed gelatin were added to each emulsion. The emulsions were stirred for 20 minutes at 45° C. in order to dissolve this gelatin. After standing overnight in a cold storage room, the emulsions were shredded and washed. They were then melted in the container at a temperature of 42° C. The weight of each of the emulsions was brought to 6.3 kg. (14 lbs.) by adding 100 gm. of gelatin soaked in the required amount of distilled water. Finishing was accomplished in 30 minutes, at a temperature of 60° C.

The photographic elements prepared as described were exposed to light and tested to determine their characteristics and found to behave satisfactorily in all regards especially when a suitable pelloid was applied to the back of the support. If desired the silver halide emulsion can be coated upon a subbing which is first applied to the film support and may be composed of a suitable gelatin composition or a terpolymer latex as described in the prior art, e.g. a latex of an acrylic ester, a vinyl or vinylidene halide and an unsaturated acid such as acrylic acid or itaconic acid, cf. U.S. 2,570,478.

In the data presented herein the flexibility test was performed and the values recorded as to well cured film having a minimal retention of solvent since solvent retention in recently made film may give unrealistic values as to flexibility. The M.I.T. folds test was performed using an M.I.T. folding endurance tester made by Tinius Olsen; the technique employed is that originally designed some years ago for testing the flexibility of paper and now generally recognized as applicable to sheets of synthetic resins, viz. ASTM Method D–643–43.

The block copolyesters as described are also useful as sheet packaging materials, adhesive tape bases, kinescope recording tape, dielectrics for condensers, etc. They have high melting points and are tough, elastic, tear resistant, resilient and are endowed with good electrical properties under various conditions including moist humid air in the tropics, air frictional heat in the nose cones of rockets or missiles, carbon arc motion picture projection, etc.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. An improved polycarbonate of 2,2-bis(3,5-dichloro-4-hydroxyphenyl)propane consisting of a highly polymeric block copolymer having an inherent viscosity of from about 0.5 to about 3.5 essentially composed of alternating blocks having the structures:

I. Blocks characterized in that these blocks as an independent polymer would have an inherent viscosity of at least 0.05 measured in chloroform and be composed of from about 3 to about 50 recurring units having the following formula (A):

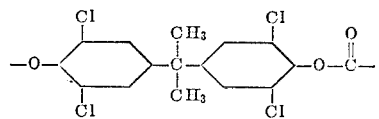

and

II. Blocks characterized in that these blocks as an independent polymer would have an inherent viscosity of at least 0.05 measured in chloroform and be composed of about 3 to about 50 recurring units having the following formula (B):

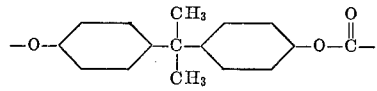

wherein from about 15 to 35 mole percent of said block copolymer is composed of said units having formula (B), said block copolymer being characterized by having a heat softening temperature in the range of from about 180°–240° C., having a Young's Modulus of elasticity for film which is substantially as great as for the homopolymer of units of formula (A) and at least about 30,000 kg./sq. cm., and having a flexibility measured by the M.I.T. folds test at least about 3 times greater than for the homopolymer of units of formula (A) and at least about 50.

2. An improved film of a polycarbonate as defined in claim 1.

3. An improved polycarbonate as defined in claim 1 wherein the mole percent of said block copolymer composed of said units having formula (B) is 25%.

4. An improved film of a polycarbonate as defined in claim 3 particularly characterized by having a heat softening temperature of about 220–240° C., having a Young's Modulus of elasticity of about 30,000 kg./sq. cm. and having a flexibility measured by the M.I.T. folds test on the order of about 70.

References Cited in the file of this patent

UNITED STATES PATENTS 2,970,131    Moyer _____ Jan. 31, 1960

FOREIGN PATENTS 772,627    Great Britain _____ Apr. 17, 1957

OTHER REFERENCES

Chemical Week, June 1, 1957, pp. 57–60.

Schnell: Ind. Eng. Chem., 52, 157–160 (February 1959).